(12) United States Patent
Zuo et al.

(10) Patent No.: US 8,247,109 B2
(45) Date of Patent: Aug. 21, 2012

(54) BATTERY COVER STRUCTURE FOR PORTABLE ELECTRONIC DEVICE

(75) Inventors: Zhou-Quan Zuo, Shenzhen (CN); Hong Wu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 393 days.

(21) Appl. No.: 12/644,102

(22) Filed: Dec. 22, 2009

(65) Prior Publication Data
US 2010/0291433 A1 Nov. 18, 2010

(30) Foreign Application Priority Data
May 15, 2009 (CN) .......................... 2009 1 0302369

(51) Int. Cl.
*H01M 2/00* (2006.01)
(52) U.S. Cl. ........... 429/163; 429/175; 429/177; 429/96
(58) Field of Classification Search .................. 429/177, 429/175, 163, 185, 96, 97; 361/600; 403/52, 403/81, 83, 24
See application file for complete search history.

(56) References Cited

U.S. PATENT DOCUMENTS

| 7,306,491 | B1* | 12/2007 | Wei ............................... 439/630 |
| 7,647,079 | B2 | 1/2010 | Zuo et al. |
| 2006/0281501 | A1* | 12/2006 | Zuo et al. .................... 455/575.1 |

FOREIGN PATENT DOCUMENTS

CN 1893445 A 1/2007

* cited by examiner

*Primary Examiner* — Raymond Alejandro
(74) *Attorney, Agent, or Firm* — Altis Law Group, Inc.

(57) ABSTRACT

A battery cover structure includes a removable cover and a main body. The cover defines two cutouts at an end thereof. The main body includes a first housing and a second housing. The first housing defines a through hole. An elastic arm extending from the first housing and is received in the through hole. Two latching blocks respectively extend from two sides of the arm and are respectively engaged in the cutouts of the cover. The arm includes a distal portion. The second housing is integrally formed with the first housing. The second housing includes a flexible operating portion above the distal portion of the arm. When the operating portion is pressed down, the at latching blocks are detached from the cutouts so as to remove the cover.

8 Claims, 8 Drawing Sheets

BATTERY COVER STRUCTURE FOR PORTABLE ELECTRONIC DEVICE

BACKGROUND

1. Technical Field

The present disclosure relates to portable electronic devices, particularly, to a battery cover structure for a portable electronic device.

2. Description of Related Art

Portable electronic devices such as mobile phones, personal digital assistants, etc., generally have main bodies and battery covers. A portable electronic device generally includes a battery cover structure, which is used to attach the battery cover to the main body. A conventional battery cover structure may include a main body, a cover, a button, and a spring. The button is attached to the main body, and the spring abuts the bottom of the button. The button may move relative to the main body under the role of the elastic force of the spring. The cover defines a through hole allowing the button to extend through, so as to lock the cover to the main body. The button and the spring are pressed down to attach or detach the cover to/from the main body. When the button is released, the spring rebounds to its original shape and pushes the button to return back to its original position. However, the battery cover structure is complicated. During disassembly, the button is susceptible to damage. Furthermore, the spring will deteriorate over time due to metal-fatigue thus effecting the longevity of the battery cover structure.

Therefore, there is chamber for improvement within the art.

BRIEF DESCRIPTION OF THE DRAWINGS

Many aspects of the battery cover structure can be better understood with reference to the following drawings. The components in the drawings are not necessarily drawn to scale, the emphasis instead being placed upon clearly illustrating the principles of the battery cover structure, in which.

DETAILED DESCRIPTION

Figure 1:
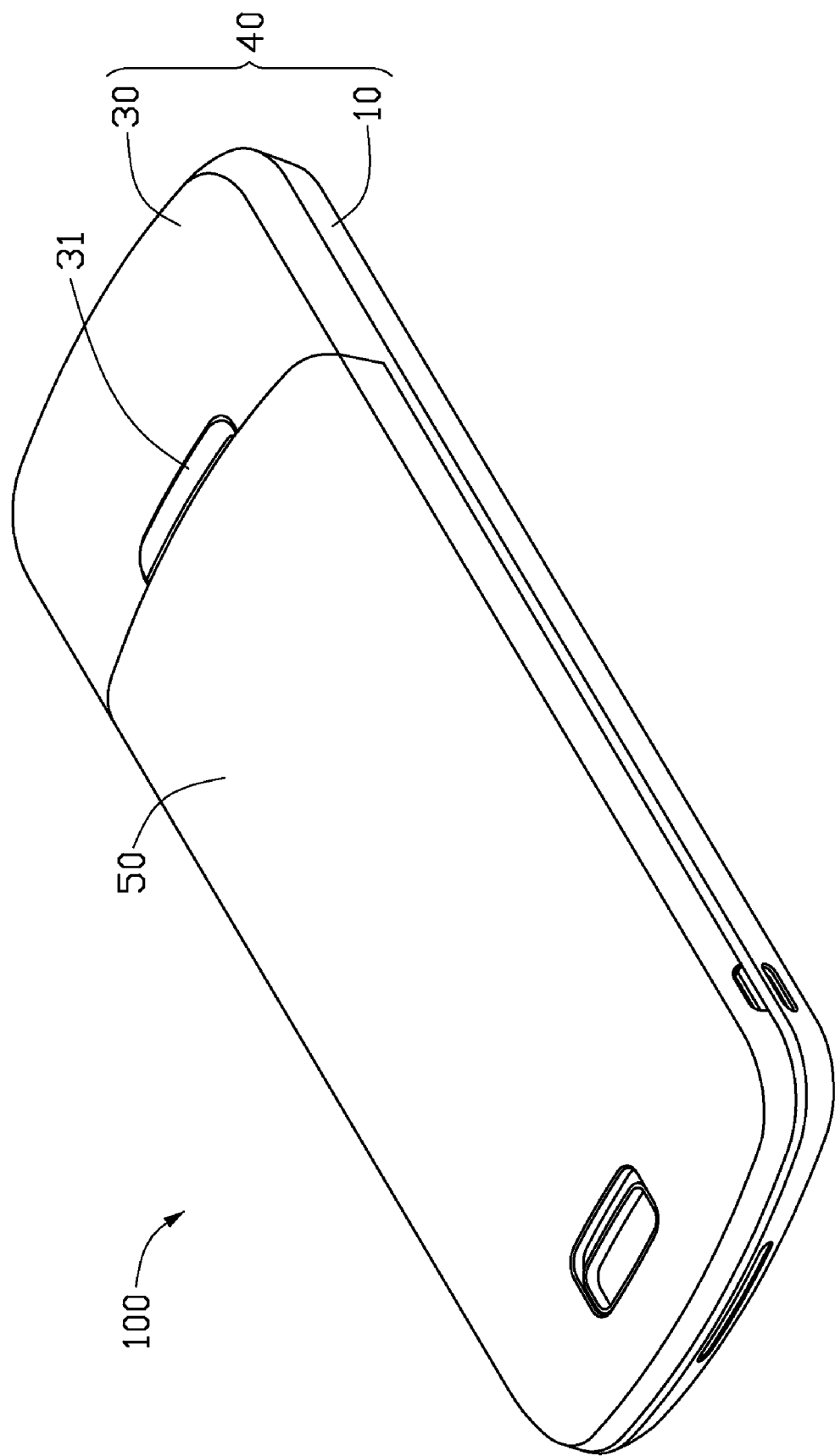
FIG. 1 is an assembled, schematic view of a battery cover structure, in accordance with an exemplary embodiment.

FIG. 1 shows an exemplary embodiment of a battery cover structure 100 applied to a portable electronic device (not labeled). The battery cover structure 100 includes a main body 40 and a removable cover 50. The main body 40 includes a first housing 10 and a second housing 30 attached to the first housing 10.

Figure 2:
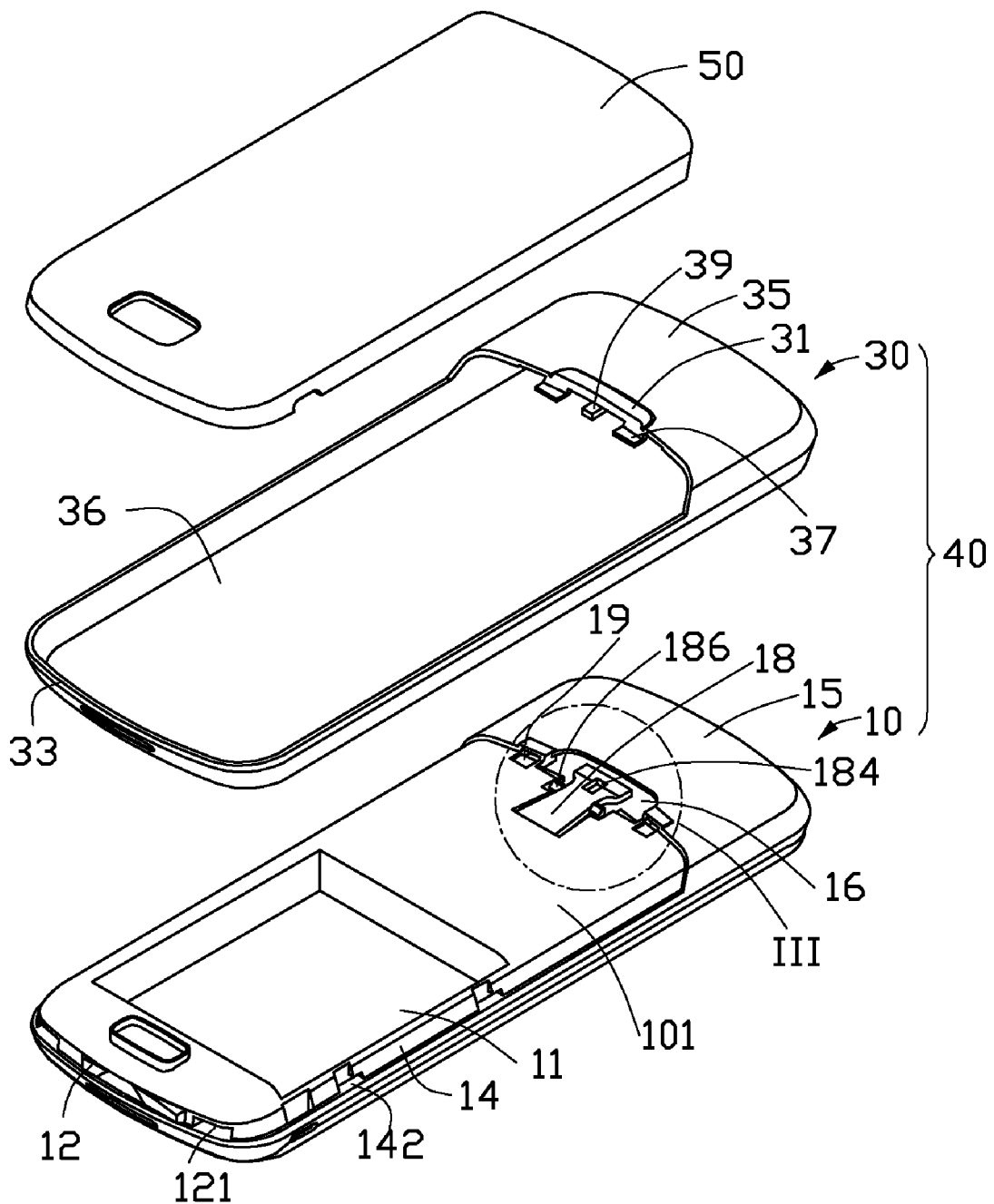
FIG. 2 is an exploded, schematic view of the battery cover structure shown in FIG. 1.

Referring to FIG. 2, the first housing 10 includes a top surface 101 and defines a battery receiving cavity 11 in the top surface 101. The first housing 10 includes an end portion 12, two sidewalls 14 and a rear portion 15. Each sidewall 14 includes two locking grooves 142. The end portion 12 respectively defines two notches 121 at two ends thereof.

Figure 3:
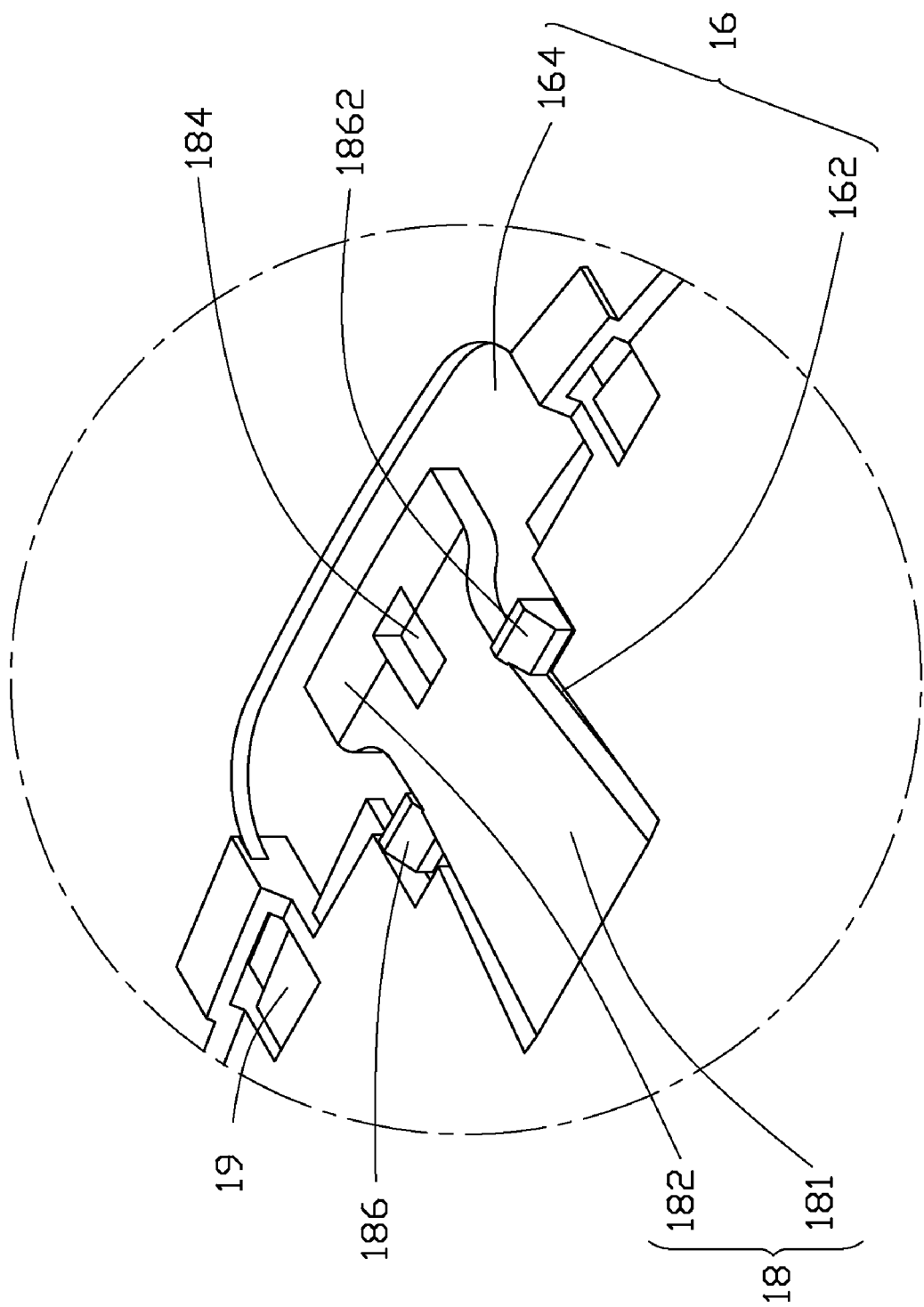
FIG. 3 is an enlarged view of a circled portion III of FIG. 2.

Referring to FIG. 3, the rear portion 15 includes a through hole 16 and an elastic arm 18 extending into the through hole 16. In this exemplary embodiment, the through hole 16 is T-shaped and includes a first hole 162 and a second hole 164, wherein the first hole 162 is narrower than the second hole 164. The arm 18 extends from the first hole 162 into the second hole 164. The arm 18 includes a distal portion 182 in the second hole 162 and a connecting portion 181 in the first hole 161. The connecting portion 181 extends from the top surface 101 and connects to the distal portion 182. The distal portion 182 defines a slot 184. Two latching blocks 186 respectively extend from two opposite sides of the connecting portion 181. Each latching block 186 includes a slope 1862 for conveniently sliding when the cover is attached to or detached from the main body 40. Two grooves 19 are respectively defined at two opposite sides of the through hole 16.

Referring back to FIG. 2, the second housing 30 includes a frame 33 and a board 35 formed on the frame 33. The frame 33 defines a receiving chamber 36 inside. The board 35 is positioned at one end of the frame 33 and extends over the receiving chamber 36. A flexible operating portion 31 is formed at an edge of the board 35, extending to the receiving chamber 36. The operating portion 31 corresponds to the distal portion 182 of the arm 18. Two extending blocks 37 extend from the operating portion 31 toward the receiving chamber 36, and have a space defined therebetween for receiving the distal portion 182 of the arm 18. A projection 39 is positioned between the two extending blocks 37, corresponding to the slot 184 of the arm 18. Each of the extending blocks 37 and the projection 39 includes a U-shaped portion 311 (FIG. 8) connected to the operating portion 31 to reduce resistance of the operating portion 31 when pressed or released to rebound. In this exemplary embodiment, the second housing 30 is integrally formed with the first housing 10 by injection molding. The frame 33 surrounds edges of the first housing 10, and the board 35 and the top surface 101 fit together. Using injection molding, the projection 39 is formed in the slot 184 and the two extending blocks 37 are molded to connect to the distal portion 182 of the arm 18, so that the operating portion 31 firmly connects to the distal portion 182 of the arm 18.

Figure 4:
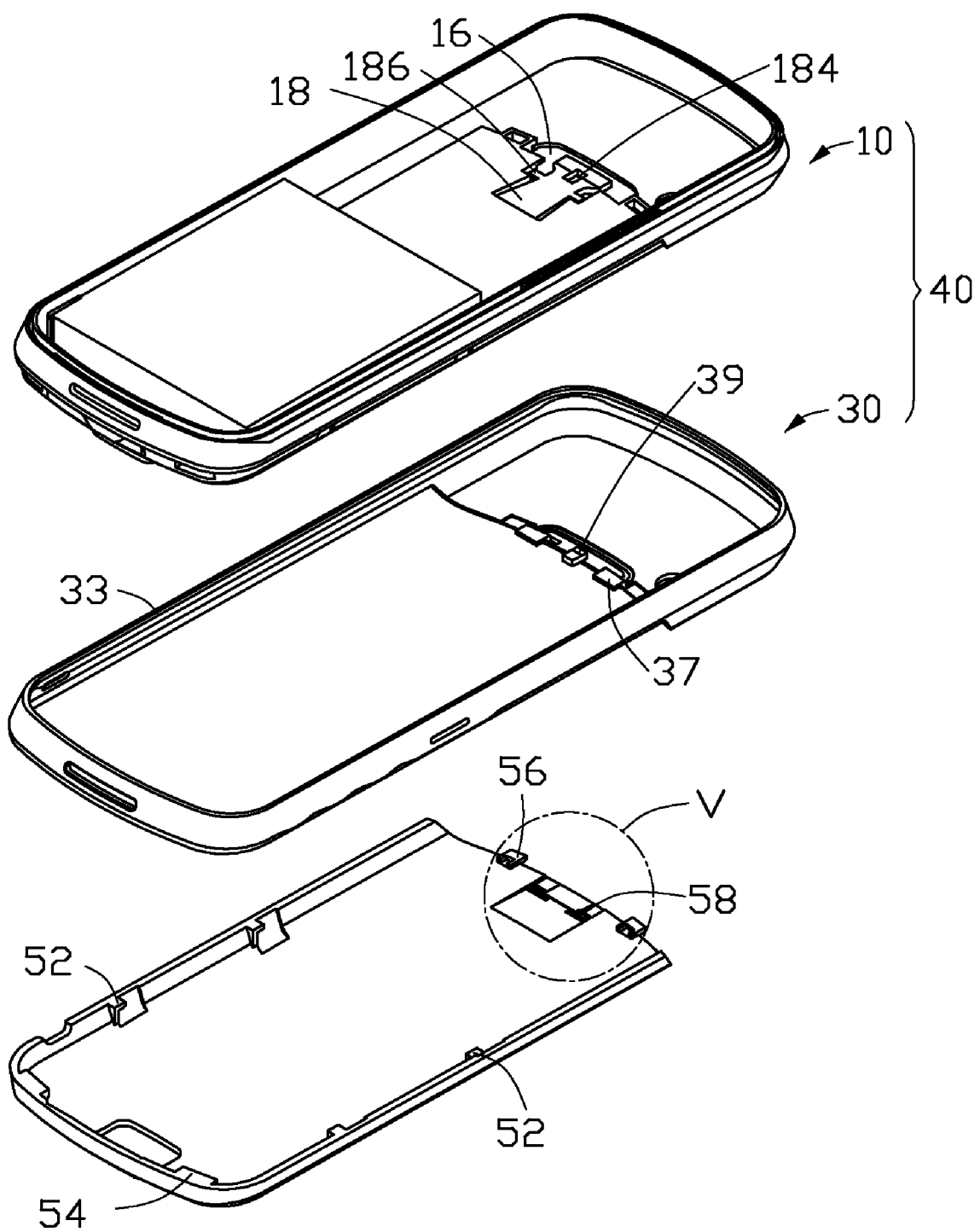
FIG. 4 is similar to FIG. 2, but showing the battery cover structure from another aspect.
Figure 5:
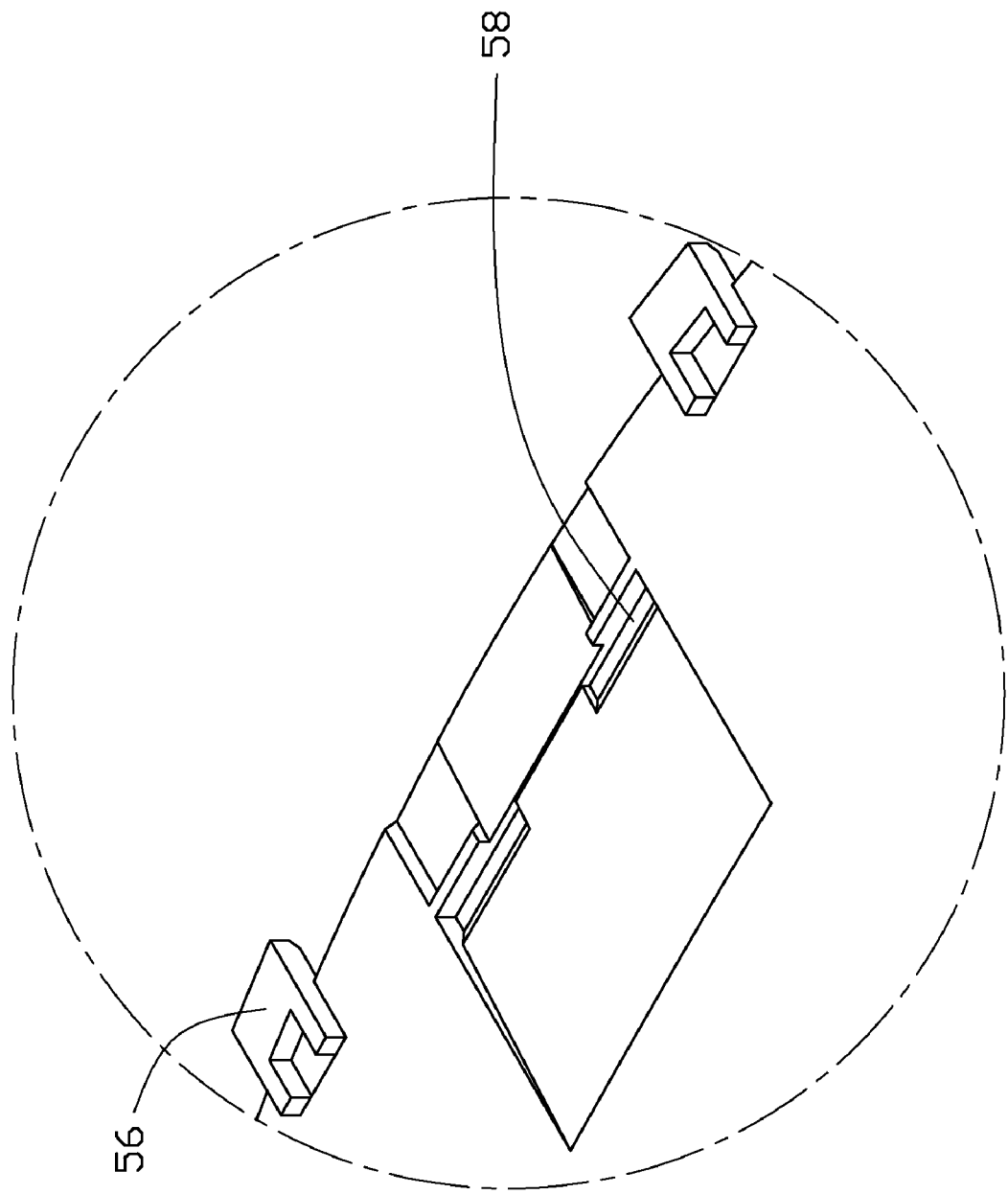
FIG. 5 is an enlarged view of a circled portion V of FIG. 4.

Referring to FIGS. 4-5, the removable cover 50 includes two ledges 52 at two opposite sides thereof for engaging in the locking grooves 142 of the first housing 10. Two latches 54 are formed at one end of the cover 50 for engaging in the notches 121 of the first housing 10. Two tabs 56 are formed at the other end of the cover 50 for engaging in the grooves 19. The removable cover 50 defines two cutouts 58 for receiving the latching blocks 186

Figure 6:
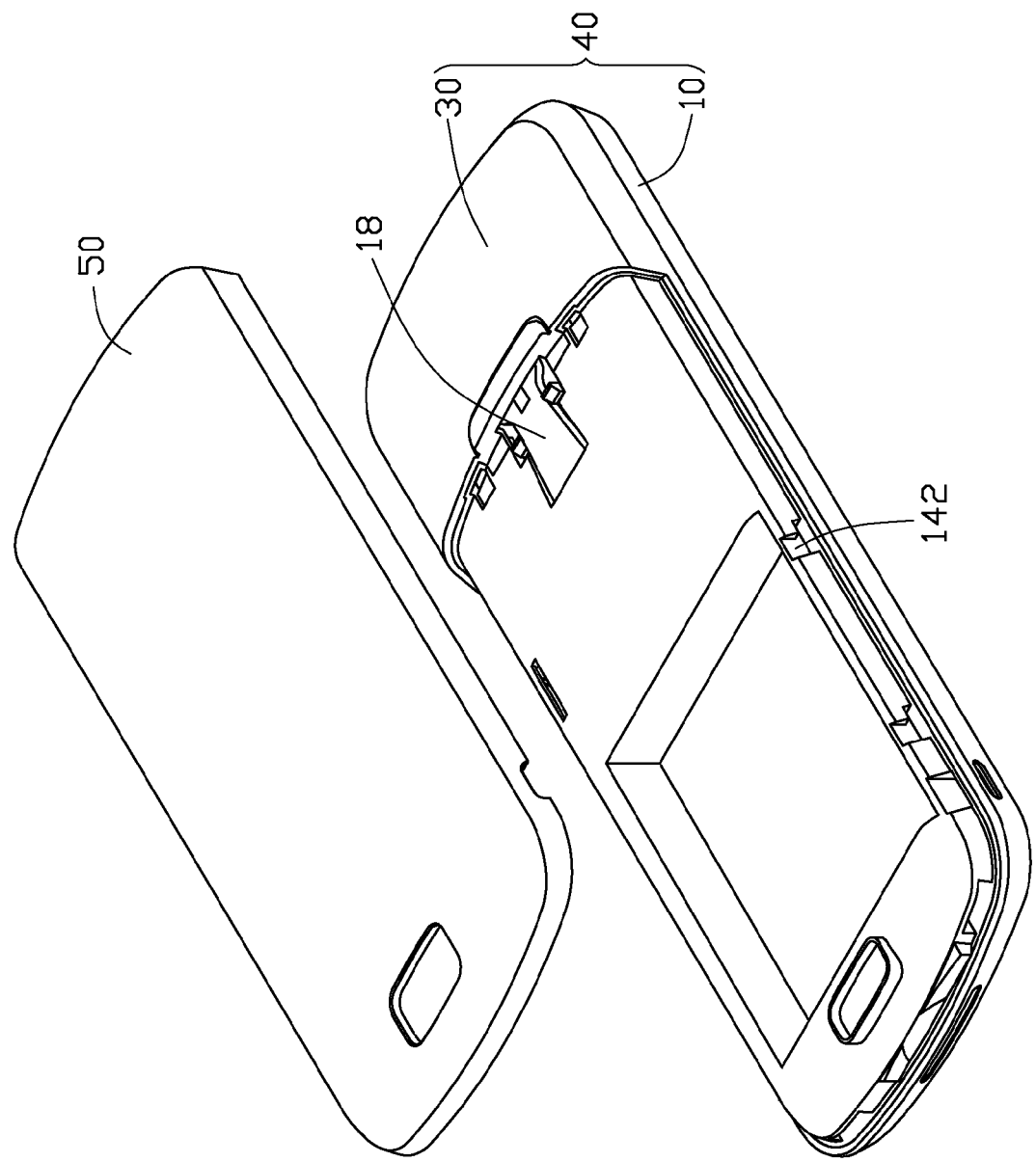
FIG. 6 is similar to FIG. 1, but showing the removable cover detached from the main body.
Figure 7:
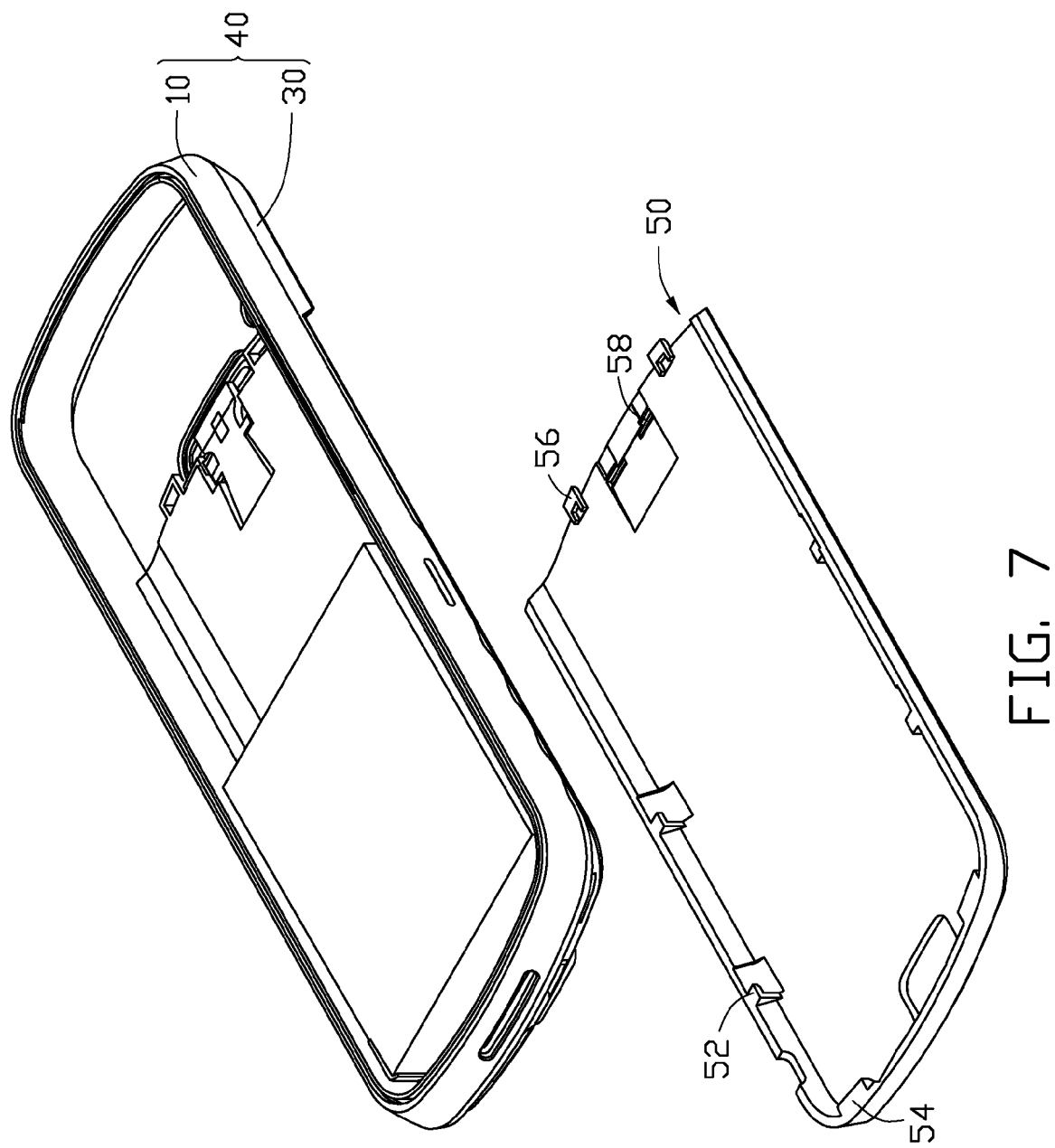
FIG. 7 is similar to FIG. 6, but from another aspect.
Figure 8:
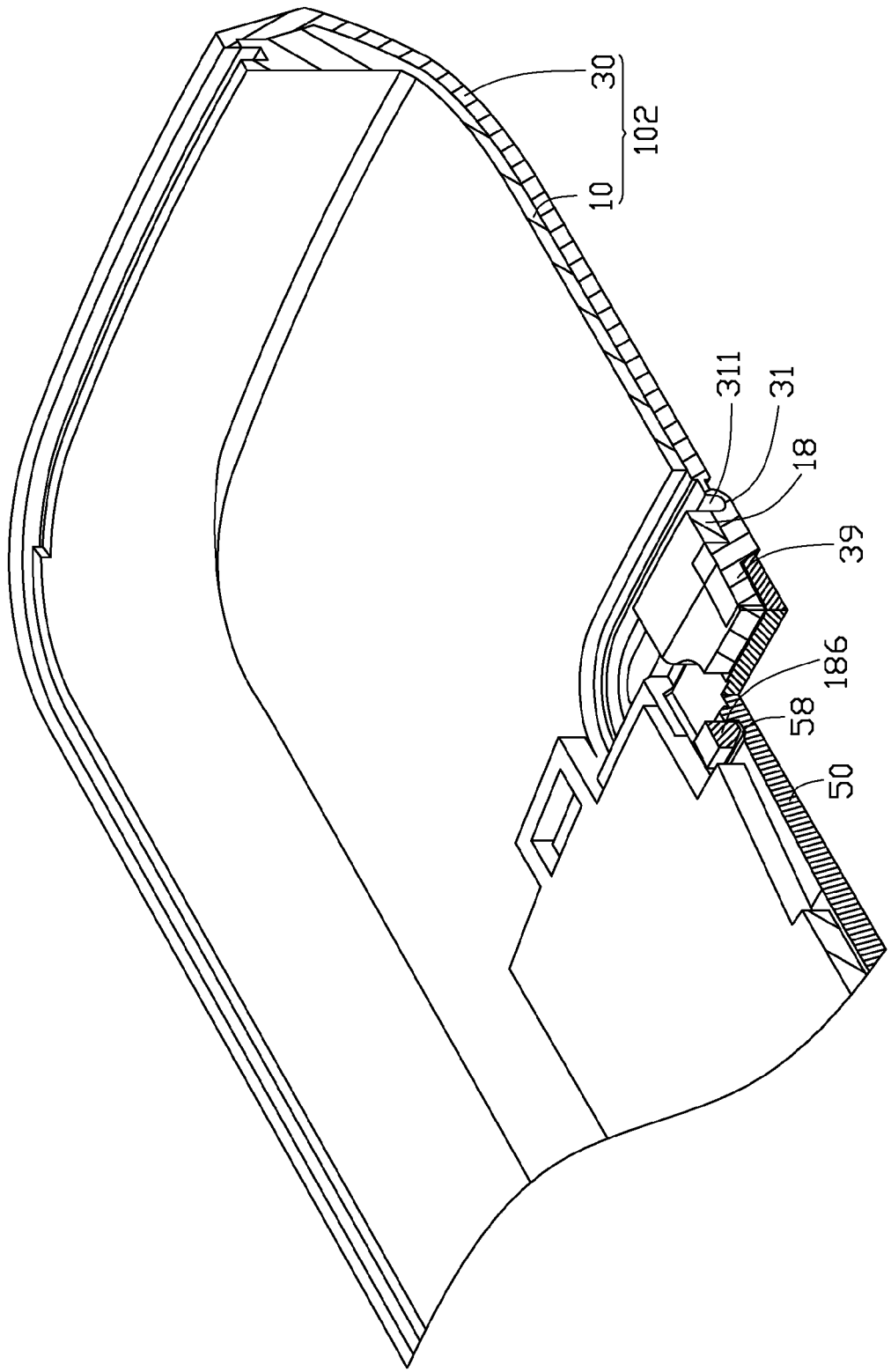
FIG. 8 is a partial section view of the battery cover structure shown in FIG. 1.

Referring to FIGS. 6-8, to attach the removable cover 50 to the main body 40, the removable cover 50 is pushed toward the board 35. The ledges 52 are pushed to engage with the locking grooves 142 correspondingly. The tabs 56 are respectively inserted into the grooves 19 and the latches 54 are respectively engaged in the notches 121. At the same time, the two latching blocks 186 respectively slide into the cutouts 58 to lock the removable cover 50 on the main body 40.

To detach the removable cover 50 from the main body 40, the operating portion 31 is pressed down. Since the projection 39 is integrally formed in the slot 184, the distal portion 182 of the arm 18 is moved down with the operating portion 31 and the arm 18 is deformed. The latching blocks 186 are detached from the cutout 58. Thus, the removable cover 50 can be removed from the main body 40. When the operating portion 31 is released, the arm 18 with the operating portion 31 rebounds to original position.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover structure comprising:
    a removable cover defining at least one cutout at an end thereof; and
    a main body including:
        a first housing defining a through hole and an elastic arm extending into the through hole, at least one latching block extending from one side of the arm and being engaged in the cutout of the cover, the arm including a distal portion; and
        a second housing attached to the first housing, the second housing including a flexible operating portion positioned above the distal portion of the arm and integrally connected to the distal portion of the arm, wherein two extending blocks extend from the operating portion, a projection extends from the operating portion and positioned between the two extending blocks, the distal portion of the arm defines a slot, and the projection is attached in the slot, the two extending blocks are connected to the distal portion the arm;
    wherein when the operating portion is pressed down, the distal portion of the arm is moved down with the operating portion, the at least one latching block is detached from the at least one cutout as to allow removal of the cover.

2. The battery cover structure as claimed in claim 1, wherein each of the extending blocks and the projection includes a U-shaped portion connecting with the operating portion.

3. The battery cover structure as claimed in claim 1, wherein the first housing is integrally formed with the second housing.

4. The battery cover structure as claimed in claim 1, wherein the number of the cutout and the latching block are respectively two, and the two latching blocks are positioned at two opposite sides of the arm.

5. The battery cover structure as claimed in claim 1, wherein the cover includes a plurality of ledges at two sides, the main body includes a plurality of locking grooves at two sides, and the locking grooves are respectively engaged with the ledges.

6. The battery cover structure as claimed in claim 5, wherein the cover further includes two latches at one end, and the main body defines two notches at one end for respectively receiving the two latches.

7. The battery cover structure as claimed in claim 6, wherein the cover further includes two tabs at another end, and the main body defines two slots at two sides of the through hole for receiving the two tabs.

8. The battery cover structure as claimed in claim 1, wherein the second housing comprises a frame and a board, the frame surrounds edges of the first housing, and the operating portion extends from the board.

* * * * *